United States Patent
Shohat

(10) Patent No.: US 9,735,970 B1
(45) Date of Patent: Aug. 15, 2017

(54) TECHNIQUES FOR SECURE VOICE COMMUNICATION

(71) Applicant: Shaul Shohat, Ramat-Gan (IL)

(72) Inventor: Shaul Shohat, Ramat-Gan (IL)

(73) Assignee: Veewear Ltd., Ramat-Gan (IL)

( * ) Notice: Subject to any disclaimer, the term of this patent is extended or adjusted under 35 U.S.C. 154(b) by 80 days.

(21) Appl. No.: 14/950,586

(22) Filed: Nov. 24, 2015

Related U.S. Application Data

(60) Provisional application No. 62/083,580, filed on Nov. 24, 2014.

(51) Int. Cl.
*H04L 9/12* (2006.01)
*H04L 9/32* (2006.01)
*H04L 9/08* (2006.01)
*H04L 29/06* (2006.01)
*H04W 12/06* (2009.01)
*G06F 21/33* (2013.01)

(52) U.S. Cl.
CPC .......... *H04L 9/3268* (2013.01); *H04L 9/0841* (2013.01); *H04L 63/0823* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 2005/0154889 | A1* | 7/2005 | Ashley | H04L 63/0435 713/171 |
| 2007/0011454 | A1* | 1/2007 | Chien | H04L 63/045 713/168 |
| 2008/0077791 | A1* | 3/2008 | Lund | H04L 9/3273 713/156 |
| 2009/0228703 | A1* | 9/2009 | Grajek | H04L 9/3268 713/156 |
| 2010/0275024 | A1* | 10/2010 | Abdulhayoglu | G06F 21/6218 713/175 |

OTHER PUBLICATIONS

New Novel Approaches for Securing VoIP Applications. Yeun et al. 2007.*
A Network Based Authentication Scheme for VoIP. Wang. 2006.*

* cited by examiner

*Primary Examiner* — Venkat Perungavoor
(74) *Attorney, Agent, or Firm* — M&B IP Analysts, LLC

(57) ABSTRACT

A secured audio apparatus (SAA) for providing secured communications between a local device and a remote device and a method for authenticating a local secured audio apparatus (SAA) associated with a local device to a remote SAA associated with a remote device are presented. The SAA includes a processing unit; and a memory, the memory containing instructions that, when executed by the processing unit, configure the SAA to: receive a remote certificate fingerprint from a remote SAA of the remote device; obtain a verified certificate based on the remote certificate fingerprint; generate an ephemeral key based on the obtained certificate, wherein the ephemeral key is used to encrypt and decrypt communications between the local SAA and the remote SAA; and secure audio communications between the local device and the remote device based on the generated ephemeral key.

30 Claims, 8 Drawing Sheets

TECHNIQUES FOR SECURE VOICE COMMUNICATION

CROSS-REFERENCE TO RELATED APPLICATIONS

This application claims the benefit of U.S. Provisional Application No. 62/083,580 filed on Nov. 24, 2014, the contents of which are hereby incorporated by reference.

TECHNICAL FIELD

The present invention relates generally to secure transmissions of voice communications.

BACKGROUND

In the past few decades, mobile communication technologies and, in particular, smartphones, have become increasingly prevalent in society. Voice communications are particularly important for transmitting sensitive personal or professional information. As use of such technology has become more readily available, attempts to eavesdrop on conversations held over mobile devices and, in particular, voice communications transmitted over mobile devices, have accordingly become more frequent. This issue of eavesdropping attempts is further compounded by the open architecture of smartphones, which leaves such smartphones vulnerable and easily compromised. Worldwide awareness of cyber warfare, along with news reports of mobile privacy loss by government entities, has brought this problem to the public's attention.

As a result of such security issues, entities now seek to encrypt communications between communicating devices. Existing solutions for encrypting communications typically attempt to solve these security issues via the mobile device itself, i.e., such that the mobile devices are equipped with communication encryption capabilities. Such solutions generally focus on solving the problem by implementing either a specific mobile device (e.g., a particular smartphone or similar device) or an application on the mobile device that introduces additional potential security flaws. As a result, such solutions may require that the user either sacrifice choice of mobile device to ensure a high level of security or sacrifice security in order to retain a choice of mobile device.

It would therefore be advantageous to provide a solution that would overcome the deficiencies of the prior art by permitting secure communications regardless of the type of devices used to communicate.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The disclosed embodiments include a secured audio apparatus (SAA) for providing secured communications between a local device and a remote device. The SAA comprises a processing unit; and a memory, the memory containing instructions that, when executed by the processing unit, configure the SAA to: receive a remote certificate fingerprint from a remote SAA of the remote device; obtain a verified certificate based on the remote certificate fingerprint; generate an ephemeral key based on the obtained certificate, wherein the ephemeral key is used to encrypt and decrypt communications between the local SAA and the remote SAA; and secure audio communications between the local device and the remote device based on the generated ephemeral key.

The disclosed embodiments also include a method for authenticating a local secured audio apparatus (SAA) associated with a local device to a remote SAA associated with a remote device. The method comprises receiving a remote certificate fingerprint from the remote SAA; obtaining a verified certificate based on the remote certificate fingerprint; generating an ephemeral key based on the obtained certificate, wherein the ephemeral key is used to encrypt and decrypt communications between the local SAA and the remote SAA; and securing audio communications between the local device and the remote device based on the generated ephemeral key.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
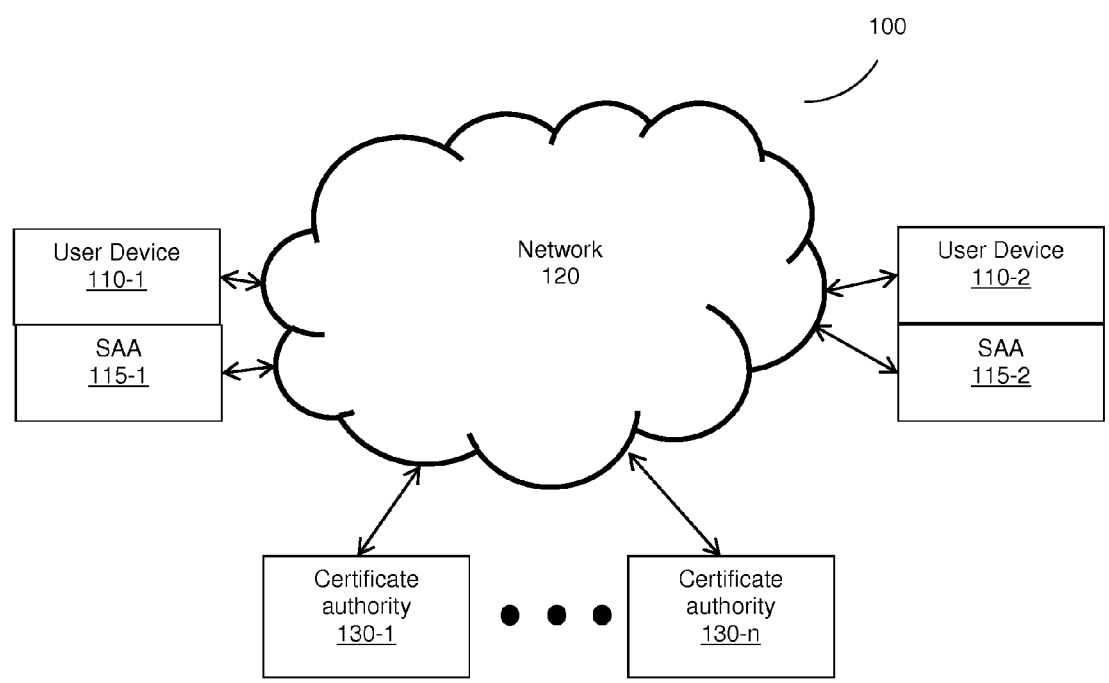
FIG. 1 is a network diagram illustrating some of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary and non-limiting network system 100 illustrating the various disclosed embodiments for enabling a secured voice communication between a user device 110-1 and a user device 110-2 over a network 120. The network 120 may be, but is not limited to, a cellular network, a wired or wireless broadband network, and a combination thereof. A cellular network may be, but is not limited to a 2G/2.5G/2.75G/3G based network, an 4G/LTE based network, and so on, or a combination thereof. A broadband network may be, but is not limited to, a local area network (LAN), a wireless LAN (WLAN), a wide area network (WAN), the Internet, and a combination thereof. Each of the user devices 110-1 and 110-2 may be, but is not limited to, a mobile phone, a smartphone, a wireless phone, a portable phone, a cordless phone, a landline phone, a PC, a tablet computer, an access point, a home gateway, an IoT gateway, an in-car entertainment system, and the like.

Each of the user devices 110-1 and 110-2 is communicatively connected to a secured audio apparatus (SAA) 115-1 and 115-2, respectively. In an embodiment, the SAAs 115-1 and 115-2 may be voice communications modules. The communication between a user device 110 and a SAA 115 may be conducted through a wireless connection facilitating communication protocol such as, but not limited to, Bluetooth® (used for wireless Bluetooth headphones and the like), ZigBee®, WiFi®, and so on. The connection between a user device 110 and a SAA 115 may also be realized by means of a wired connector such as a headset jack (e.g., Audio Jack, Phone Jack, TRS or TRRS, mono or stereo, and so on used for headphones and the likes), a USB connector, a lightning connector, combinations thereof, and so on. The SAA 115 can be implemented as, or integrated in, any communication device, such as but not limited to an earpiece, a headset, a headphone, an in-car hands free speakerphone, a wearable device, and the like.

Each SAA 115 is an authenticated device that utilizes a set of public and private keys to securely generate ephemeral (e.g., per-session) cryptographic symmetrical keys. The ephemeral symmetrical keys are used to encrypt and decrypt voice signals, i.e., phone calls transmitted and/or received from and to a remote party (i.e., via an SAA). In a preferred embodiment, the SAAs 115 allow secured calls through, or by means of, the user devices 110 without changing the functionality of the devices 110.

In an embodiment, the authentication of each SAA 115 is established based on a signed certificate, generated and issued by either the SAA 115 itself (direct-trust mode) or by a certificate authority (CA-based trust mode). The certificate of the SAA 115 can be generated and issued by an in-house certificate authority (e.g., an IT department) or by one of a plurality of third party certificate authorities 130-1 through 130-n. In an embodiment, the authentication is performed as part of the secured call set up process, based on certificates issued for users participating in the call. The certificates are issued during a personalization process of the SAAs 115 as discussed in greater detail below.

It should be noted that only two user devices 110 and two SAAs 115 are shown in FIG. 1 merely for simplicity purposes and without limitation on any of the disclosed embodiments. More than two user devices may communicate securely simultaneously or at different times without departing from the scope of the disclosed embodiments. For example, the disclosed embodiments can be utilized to establish a secured conference call or a group call.

It should be further noted that one of SAAs 115 (either the remote or local) may be connected to or integrated in a network device (not shown) that will be used as an encryption-termination inside an organization. The network device may be, but is not limited to, a server, a call exchange, a conference call gateway, a VoIP gateway, and so on.

Figure 2:
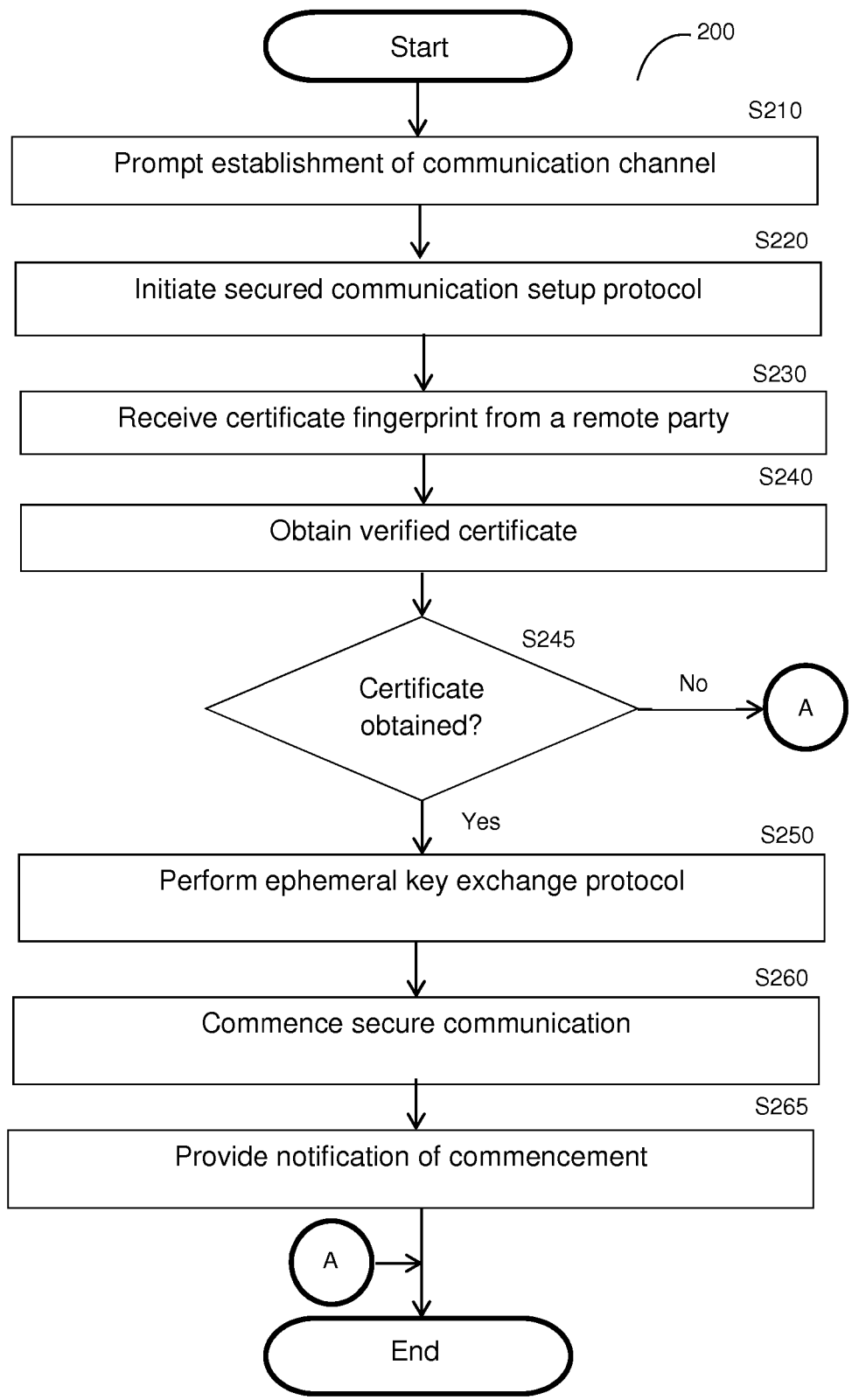
FIG. 2 is a flowchart for providing secure voice communications over an unsecured network with unsecured devices according to one embodiment.

FIG. 2 shows an exemplary and non-limiting flowchart 200 illustrating a certificate-based method for providing a secure communication between unsecured devices over a network according to an embodiment. The unsecured devices include a local device attempting to establish communication with a remote device. The steps of flowchart 200 may be performed by a SAA (e.g., the SAA 115). In such an embodiment, the local device may further include, or be communicatively connected to, a local SAA, and the remote device may further include, or be communicatively connected to, a remote SAA. In embodiments where the secure communication is ensured via a SAA, the SAA may require personalization before secure communications can be ensured. It should be noted that, after the personalization process, a secured communication may be established without the users being required to perform any additional setup.

In S210, in order to allow secured voice communication between two devices, the local device or SAA initiates a communication channel with the remote device or SAA. The devices engaging in the communication are typically unsecured. Also, the communication medium between the devices is typically initially unsecured. The communication channel may be either a voice channel or a separate available data channel.

In S220, a secured communication setup protocol is initiated. The secured communication setup protocol may be initiated in response to, e.g., a voice command, a user gesture, and so on. A user gesture may be, but is not limited to, a button press, a touch on a touch screen, and so on. The secured communication setup protocol may be conducted over, but not limited to, a uniform datagram protocol (UDP) channel, a transmission control protocol (TCP) channel, and so on. In an embodiment, two or more SAAs may initiate the secured communication setup protocol in parallel.

In S230, a certificate fingerprint is received. Each certificate fingerprint is an identifier for a certificate of a device. In an embodiment, the certificate fingerprint is received from the remote SAA. It should be noted that the local SAA can send its own certificate fingerprint upon receiving the remote certificate fingerprint. Alternatively, the local party sends its own certificate fingerprint and, in response, the remote certificate fingerprint is received. As a size of a certificate fingerprint is typically shorter than the certificate, the exchange of identities may be conducted over the network without delays, thereby ensuring a fast call set-up.

In S240, respective of the received certificate fingerprint, a verified certificate is obtained. The verified certificate typically contains information identifying the remote party such as, but not limited to, a public key, a user name (identified by a string or an audio signal), a managing certificate authority (managing CA) that verified the certificate (identified by its name and/or ID), a trust level, and so on. Obtaining verified certificates is described further herein below with respect to FIG. 3.

In S245, it is determined whether the verified certificate has been obtained and, if so, execution continues with S250; otherwise, execution terminates. In an embodiment, if it is determined that the verified certificate has not been obtained, one or more additional attempts to obtain the verified certificate may be performed. If the verified certificate is obtained via one of the additional attempts, execution may continue with S250.

In S250, a secured ephemeral key exchange protocol is performed. The secured ephemeral key exchange protocol may be based on, but is not limited to, the verified identities of the parties that will communicate, the public keys, and so on. In an embodiment, the secured ephemeral key exchange protocol may be performed via, but not limited to, a Diffie-Hellman method, an Elliptic Curve Diffie-Hellman method, a Rivest-Shamir-Adleman (RSA) public-key encryption method, an integrated Diffie-Hellman Digital-Signature-Algorithm (DH-DSA) key exchange method, an integrated DH-RSA, an integrated ECDH-RSA, an integrated ECDH-ECDSA, and so on.

In S260, a secure communication is commenced between the local SAA and the remote SAA. As a result, a secured call can take place between the unsecured devices communicatively connected to the local and remote SAAs. In an embodiment, the communication is secured via encryption. To this end, each SAA encrypts and decrypts voice signals using the exchanged ephemeral (e.g., per-session) symmetrical keys.

In S265, a notification regarding the commencement of the secure communication is provided to the person holding the SAA or those connected to the network device. The notification may include information such as, but not limited to, a verified name of the remote party, a name of the certificate authority being used, a trust level of the certificate authority, and so on. In an embodiment, the notification may further include a speech signature or a predefined voice recording associated with the remote party or a notification that may be displayed on a display.

Figure 8:
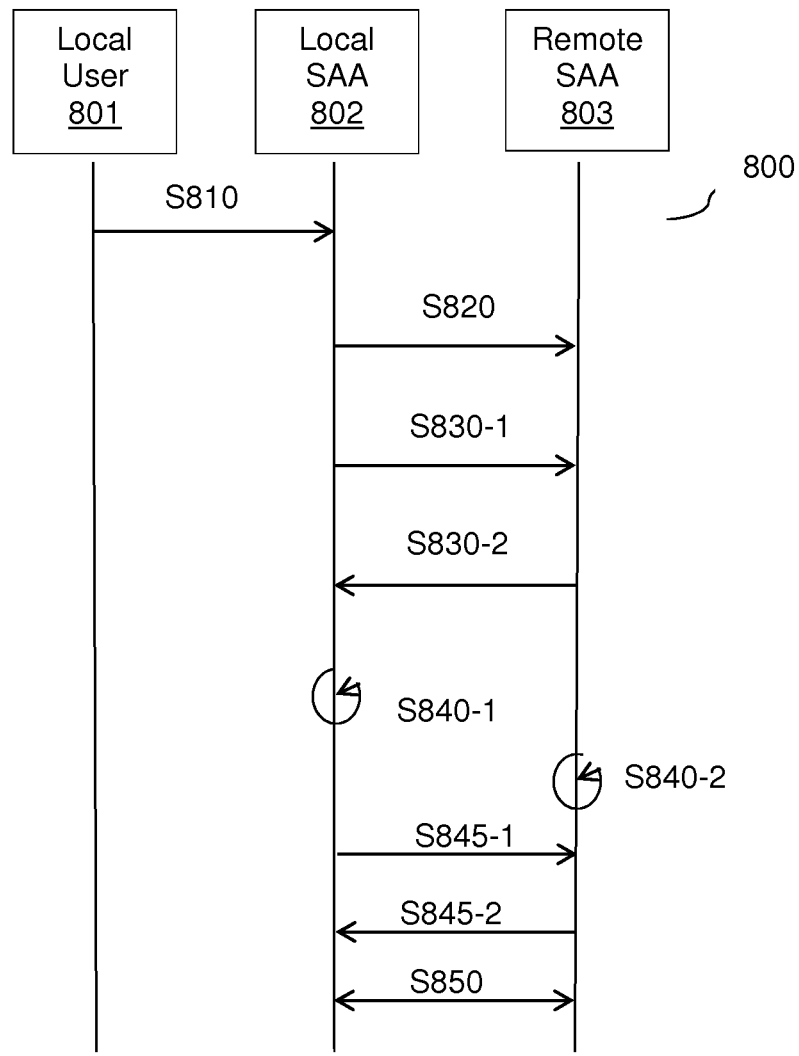
FIG. 8 is a sequence diagram illustrating establishing secured voice communications between SAAs according to an embodiment.

An exemplary and non-limiting sequence diagram 800 illustrating establishment of a secured communication between a local device and a remote device is seen in FIG. 8.

In S810, a local user of a local user device 801 communicatively connected to a local SAA 802 attempts to make a secured call with a remote user (not shown) of a remote user device (not shown) communicatively connected to a remote SAA 803. In an embodiment, the local SAA and/or the remote SAA are external to the local user device and the remote user device, respectively.

In S820, the local SAA 802 initiates a secured communication protocol with the remote SAA 803.

In S830-1 and S830-2, each of the local SAA 802 and the remote SAA 803 are configured to send a respective certificate fingerprint to the other SAA.

In S840-1 and S840-2, after receiving the respective certificate fingerprint, each SAA retrieves a verified certificate matching the received certificate fingerprint and generates an ephemeral key based on the matching verified certificate.

In S845-1 and 845-2, if the certificate fingerprint does not exist at the local SAA 802, the local SAA 802 requests for the remote SAA 803 to send the complete certificate to the local SAA 802, and vice versa.

In S850, a secured communication is commenced between the local SAA 802 and the remote SAA 803 using the ephemeral keys. During the secured communication, each SAA encrypts and decrypts audio communications transmitted between the SAAs using the ephemeral keys. It should be noted that FIG. 8 is described with respect to a local SAA initiating communications with a remote SAA merely for simplicity purposes and without limitation of the disclosed embodiments.

Figure 3:
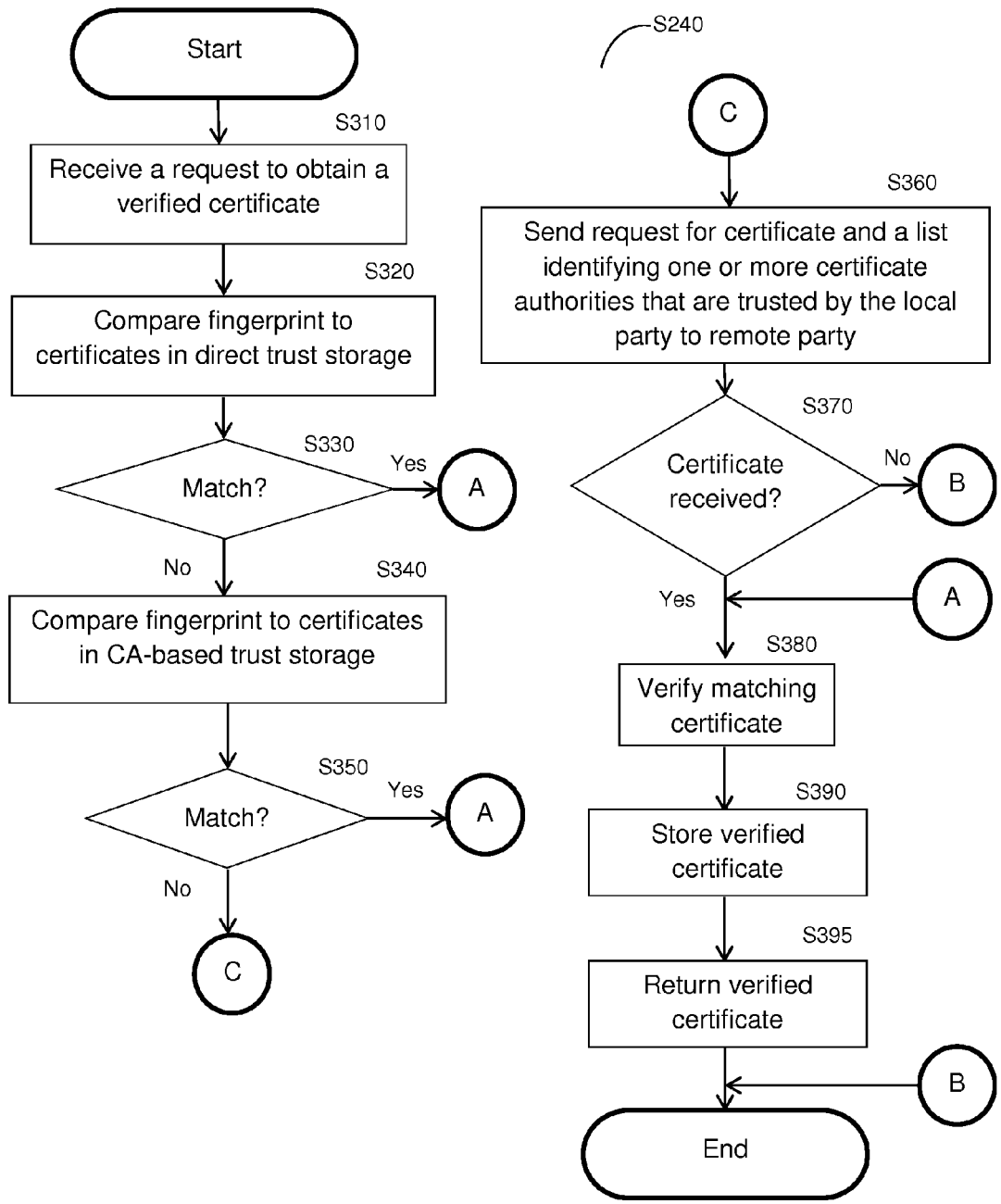
FIG. 3 is a flowchart illustrating obtaining a verified certificate of a remote party according to an embodiment.

Referring now to FIG. 3, which is an exemplary and non-limiting flowchart S240 illustrating a method for obtaining a verified certificate according to an embodiment. In S310, a request to obtain a verified certificate of a remote party is received. The request typically includes the certificate fingerprint of the remote party.

In S320, the received certificate fingerprint is compared to one or more certificates stored in a direct-trust storage to find an appropriate certificate. In an embodiment, comparison between a certificate and a certificate fingerprint includes, but is not limited to, comparing the received certificate fingerprint to a fingerprint calculated from or included in the certificate. In an embodiment, the fingerprint can be, but not limited to, the result of a cryptographic hash function on the certificate. In a further embodiment, the comparison between the certificate and the certificate fingerprint includes dictionary lookup of the received certificate fingerprint in a certificate cache table.

A direct-trust storage is a storage of SAAs that were directly authenticated by the local SAA (as described herein below with respect to FIG. 5) without a Certificate Authority (CA) involved.

In S330, based on the comparison, it is determined whether the received certificate fingerprint matches one of the certificates. If so, execution continues with 380; otherwise, execution continues with S340.

In S340, the received certificate fingerprint is compared to certificates stored in a CA-based trust storage. A CA-based trust storage is a storage of SAAs that were authenticated by a certificate authority that is trusted by the local party or by one of the local party's trusted certificate authorities. Such comparison between a certificate and a certificate fingerprint may include, but is not limited to, comparing the received certificate fingerprint to a fingerprint calculated from or included in the certificate stored in the CA-based trust storage. Various techniques for performing comparisons are discussed above.

In S350, it is determined whether the received certificate fingerprint matches one of the certificates in the CA-based trust storage. If so, execution continues with S380; otherwise, execution continues with S360. Typically, it is determined that the received certificate fingerprint does not match any of the certificates in the CA-based trust storage if the parties have not previously communicated using the SAAs. If the parties have previously established communications using the SAAs, then their respective certificates are typically already stored in the CA-based trust storage. It should be noted that the certificates may be override, revoked, aged, and/or timed out. As a result, the remote certificate may not be stored at the local SAA even while the local certificate is stored at the remote SAA. This would require obtaining the certificate from the remote SAA.

In S360, a request for a certificate is sent to the remote party. In an embodiment, the request includes a list identifying one or more trusted certificate authorities that are trusted by the local party. In response to the request, the remote party may either return an appropriate certificate or a 'null' value indicating that such certificate does not exist. The process for determining the existence of such a certificate is based on the trust established by the certificate authorities (CAs) and is described further herein below with respect to FIG. 4. The appropriate certificate received from the remote party should be provided by a certificate authority that was identified as trusted by the local party in the request. The appropriate certificate may be a chain of recursive certificates (discussed in detail below).

In S370, it is checked if an appropriate certificate is received from the remote party and, if so, execution continues with S380; otherwise, execution terminates. In an embodiment, one or more additional attempts to obtain the appropriate certificate may be performed prior to termination of the process.

In S380, upon receiving a certificate of the remote party, the certificate's validity is verified. In an embodiment, if the certificate is not verified as valid, a notification respective thereof may be provided. In S390, the verified certificate is stored in a CA-based trusted storage. In S395, the verified certificate is returned.

Figure 4:
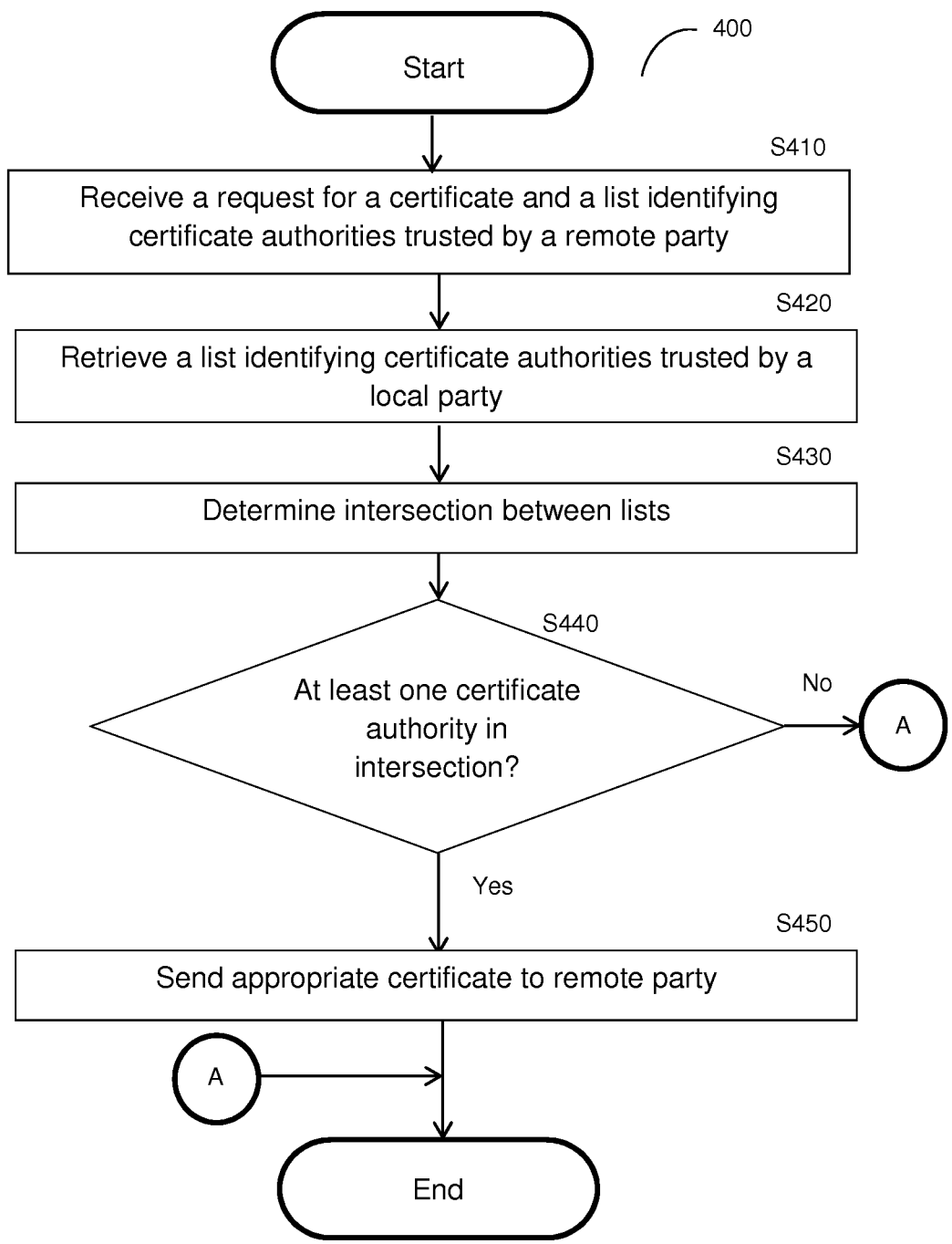
FIG. 4 is a flowchart illustrating establishing trust between unsecured devices based on a certificate authority according to an embodiment.

FIG. 4 is an exemplary and non-limiting flowchart 400 illustrating a method for establishing CA-based trust according to an embodiment. As noted above, the method is performed in order to provide an appropriate certificate based on trusted certificate authorities. In S410, a request for a certificate and a list identifying one or more certificate authorities that are trusted by a remote party are received. The request is sent from the remote party (see, e.g., S360, FIG. 3). In S420, a list identifying one or more certificate authorities that are trusted by a local party is retrieved.

In S430, the intersection between the local trusted list of certificate authorities and the remote trusted list of certificate authorities is determined. The intersection between the lists may be a list containing each certificate authority that was identified in both the local list and the remote list. As a non-limiting example, the list of trusted CAs of the remote party includes the following trusted CAs {CA-1, CA-2, and CA-3} and the list of trusted CAs of the local party includes the following {CA-2 and CA-4}. Therefore, the intersection includes the certificate authority CA-2 that is trusted by both parties.

In S440, it is determined whether at least one certificate authority is in the intersection. If so, execution continues with S450; otherwise, execution terminates. In an embodiment, if no certificate authorities are contained in the intersection, a message indicating that the intersection was empty may be generated and sent to the local party and/or to the remote party.

In S450, an appropriate certificate issued by one of the certificate authorities in the intersection (e.g., CA-2 in the above example) is sent to the remote party. The appropriate certificate may be a chain of recursive certificates (discussed in detail below). In an embodiment, when there are two or more certificate authorities in the intersection list, a certificate issued by the certificate authority with the highest trust level is sent to the remote party as the appropriate certificate. In another embodiment, certificates issued by all certificate authorities in the intersection list are sent to the remote party. In another embodiment, the certificate authority that will receive the request may be determined randomly.

In an embodiment, the received appropriate certificate may be stored in, but is not limited to, any of: memory of one of the devices, memory of an SAA communicatively connected to one of the devices, cloud storage, and so on.

In various embodiments, a trust level may be determined respective of each of the received certificates. In some embodiments, such trust levels are based on the trust level of the intersected CAs associated with the certificates in the intersection. The trust level is typically an integer value that represents the degree to which a certificate authority is trusted. Lower numbers for trust levels generally represent higher degrees of trust, although different relationships between trust levels and degrees of trust may be utilized without departing from the scope of the disclosure. As a non-limiting example, a highly trusted certificate authority (e.g. a managing CA) may be assigned a trust level of 1, while a marginally trusted certificate authority may be assigned a trust level of 3. In an embodiment, the trust level may be further influenced by other parameters. Parameters that may influence a trust level may include, but are not limited to, reviews from other users, a physical location of the CA, and so on.

In an embodiment, the intersected CA may be part of a recursive chain of CAs from the remote party's managing CA up to the intersected CA. Each certificate in the chain may be signed or issued by a different CA. In the above example, for a remote managing certificate authority, CA-1, and the intersected certificate authority, CA-2, the chain of recursive certificates may be represented as follows: remote party certificate (signed by CA-1), CA-1 certificate (signed by CA-2). In order to establish a connection with the remote SAA, the intersected CA-2 enables the local SAA to trust CA-1.

As an example, Bill works at Macrofirm, and Eric and Meir work at Golplex. Bill has an earpiece (SAA) that was personalized with his name at the Macrofirm United States (US) CA (trust level 1). The Macrofirm US CA certificate was issued by Macrofirm Corp CA, and the Macrofirm Corp. CA certificate was issued by Global CA.

Eric has an earpiece that was personalized with his name at Golplex California CA (trust level 1). Meir has an earpiece that was personalized with his name at Golplex Tel Aviv CA (trust level 1). Both CAs have certificates that were issued by Golplex Inc. CA, and the Golplex Inc. CA certificate was issued by Global CA.

The following certificates are loaded on each earpiece:

Bill: self-certificate (signed by Macrofirm US) trust level tl-0, Macrofirm US certificate (signed by Macrofirm Corp.) tl-1, Macrofirm Corp. certificate (signed by Global CA) tl-2, and Global CA certificate (root, self-signed) tl-3.

Eric: self-certificate (signed by Golplex California) tl-0, Golplex California certificate (signed by Golplex Inc.) tl-1, Golplex Inc. certificate (signed by Global CA) tl-2, and Global CA certificate (root, self-signed) tl-3.

Meir: self-certificate (signed by Golplex Tel Aviv) TL-0, Golplex Tel Aviv certificate (signed by Golplex Inc.) tl-1, Golplex Inc. certificate (signed by Global CA) tl-2, and Global CA certificate (root, self-signed) tl-3.

When Bill and Eric call each other, the only shared certificate is Global CA, so each side uses this certificate to verify the company-level-CA, that verifies the regional-CA, that verifies the personal certificate, which makes it a call at trust level 3 for both sides (UI for Eric: "this is a secure call with Bill at trust level 3, verified by Macrofirm US, Macrofirm Corp, Global CA")

When Eric and Meir call each other, they have both Golplex Inc. and Global CA certificates shared. In this case, Eric and Meir choose Golplex Inc. and set up a call at trust level 2 (and the UI will stop at Golplex Inc. because there was no need to trust Global CA at any point).

When setting up earpieces in Golplex Tel Aviv, the managing CA can manually add the certificate of Golplex Inc. CA as trust level 1, and then the same call can be set up as trust level 1 for Meir and trust level 2 for Eric.

Figure 5:
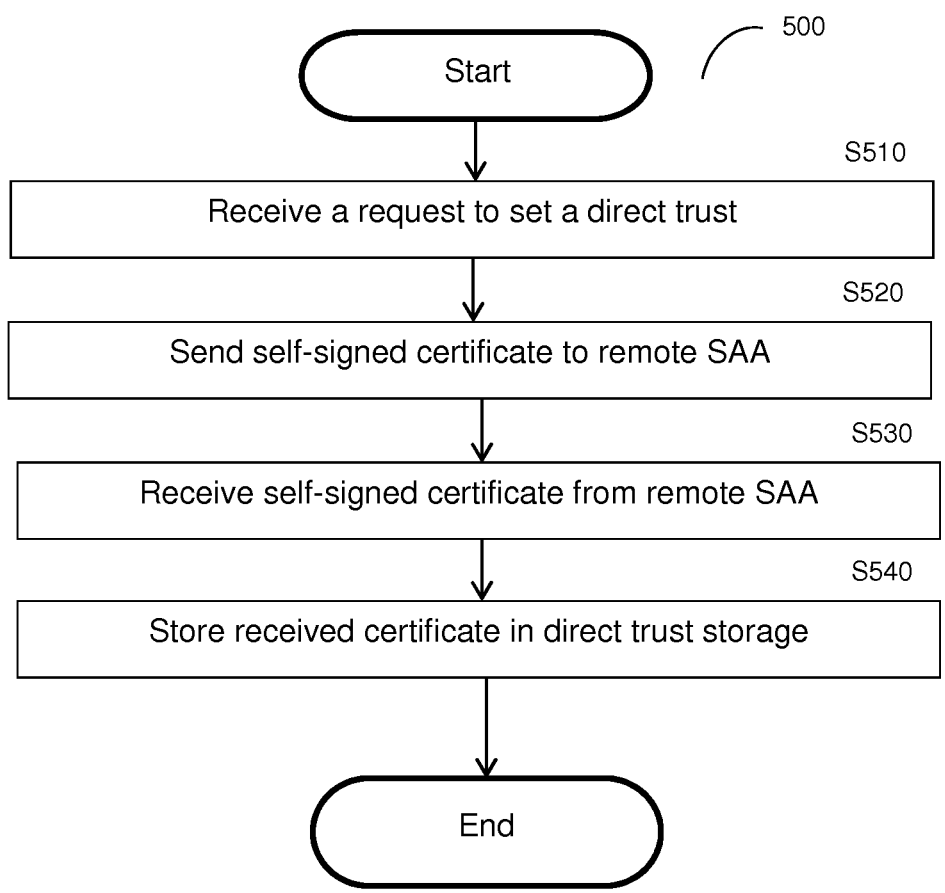
FIG. 5 is a flowchart illustrating establishing trust between unsecured devices based on a direct trust according to an embodiment.

If Eric and Meir meet in person, they can set up direct trust between them by pairing the earpieces with each other and exchanging certificates as discussed in detail in FIG. 5. Each will have a self-signed certificate for the other party and store it locally at trust level 0, so next time the call will be set up at direct trust mode with a name personalized during that meeting (UI for Meir: "Eric is calling directly from Golplex").

FIG. 5 is an exemplary and non-limiting flowchart 500 illustrating establishing direct-trust between SAAs according to an embodiment. In a typical embodiment, to establish this trust level, the users of the SAAs should be physically present at the same location (e.g., a room) or at adjacent or nearby locations, and should operate the SAAs.

In S510, a request to set a direct trust communication channel with a remote SAA is received by the local SAA. The request may be received via, e.g., a user gesture (via, for example, a button, a cradle, or a keypad), a voice command, and so on. In an embodiment, the communication channel may be set only while the remote and local SAAs are in close physical proximity (e.g., within 100 feet of each other, within 50 feet of each other, and so on). The communication channel may be, but is not limited to, a wired (e.g. USB) communication channel, an audible-communication channel, a near field communication (NFC), a Bluetooth® low energy (BLE) communication channel, and so on. The communication protocol may be established over, but not limited to, a simple (key, value) serialized protocol, and the like.

In S520, a self-signed certificate that contains the public key, the user name, and/or other identifying information of the local SAA is sent to the remote SAA over the communication channel. The user name may be in the form of a string or an audio signal.

In S530, a self-signed certificate that contains the public key, the user name, and/or the other identifying information is received from the remote SAA. In S540, the received certificate is stored in the direct trust storage of the local SAA.

Figure 6:
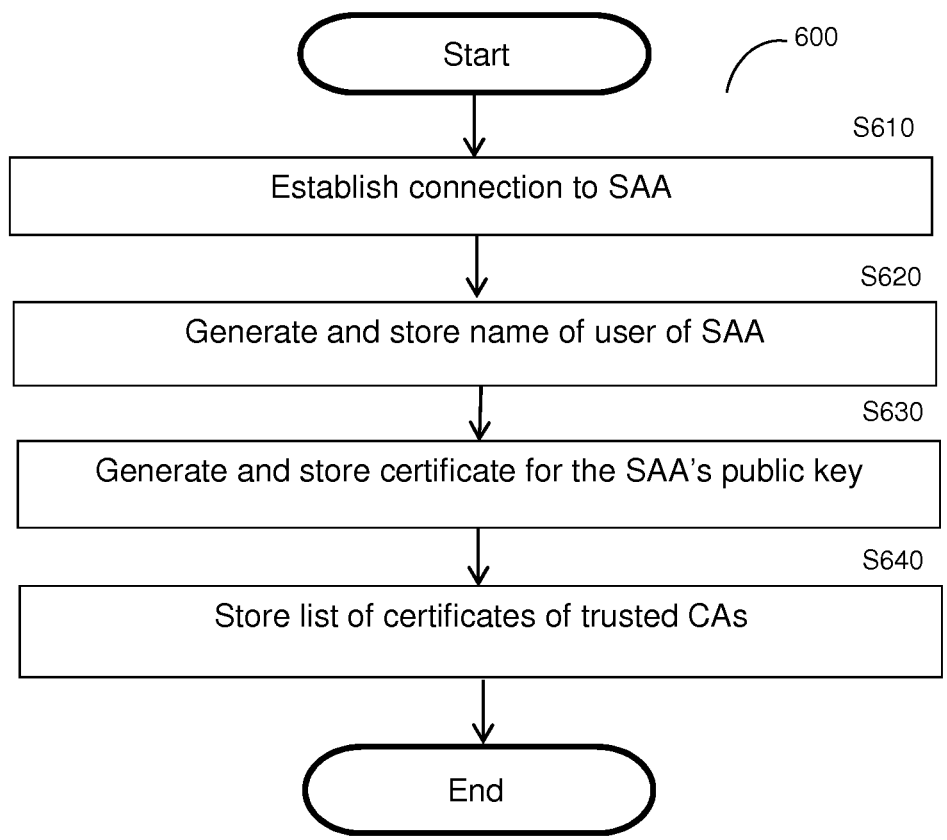
FIG. 6 is a flowchart illustrating personalization of a secured audio apparatus (SAA) according to an embodiment.

FIG. 6 is an exemplary and non-limiting flowchart 600 illustrating personalization of a SAA for ensuring secure communications over mobile devices according to an embodiment. In this embodiment, a managing CA performs the personalization of the SAA. A managing CA may be, but is not limited to, an IT department of a company, a third party certifying authority, a mobile device manager (MDM), and so on.

The managing CA may be utilized for the personalization of a dedicated computer. Such a computer may be a PC, a mobile device, a server, a cloud-based machine, a mobile device manager (MDM), and the like. Such a computer may be installed with instructions that, when executed, configure the device to perform the personalization method.

The identity of the user of the SAA is verified prior to the personalization of the SAA based, in part, on the ID of the user. Such an ID may be stored in the SAA and/or engraved in the SAA. In an embodiment, the user ID may be used for user authentication.

In S610, a connection between the SAA and the managing CA is established. The connection may be established locally, i.e., via a cable (e.g., a USB cable), or via a local network connection. In another embodiment, the connection may be established and personalization may occur remotely, i.e., over the cloud or other network connection. A network connection may be performed via Secure Shell (SSH) protocol or other secure network connection protocols.

In S620, a name for the user of the SAA is generated and stored. As noted above, the name may be in the form of a string or audio signal.

In S630, a certificate for the SAA is generated and stored. The certificate typically contains information identifying the SAA such as, but not limited to: a SAA public key, a user name, the managing CA name, ID, trust level (TL), and so on. In an embodiment, the S630 further includes receiving the SAA public key from the SAA. In a further embodiment, the generation may be performed in response to receiving the SAA public key.

In S640, a list of certificates of trusted certificate authorities that can be associated with the SAA (including CA names, IDs, trust levels and public keys) is also stored. In various embodiments, a trust level of each certificate authority is also stored. The certificate that is generated by the managing CA is typically assigned a trust level of 1. For each trusted certificate authority in the list, a recursive list of certificates issued by certificate authorities is added up to the root, with incrementing trust levels. In an embodiment, if a certificate authority is listed more than once, only one of the entries may be saved. The saved entry may be, but is not limited to, the entry with the highest trust level (i.e., the highest degree of trust).

It should be noted that once the personalization process is completed, the contents stored in the SAA can be updated, expired certificates can be replaced, the SAA can be disabled, and so on, by the managing CA. It should be noted that the SAA does not need to be physically connected to the managing CA in order to perform such operations.

It should be noted that FIGS. 2-6 are described herein above with respect to two devices, two users, and two SAAs merely for simplicity purposes and without limitation on the disclosed embodiments. Additional user devices and SAAs may be utilized. It should further be noted that FIGS. 2-6 are described with respect to a local device attempting to initiate communication with a remote device merely for simplicity purposes and without limitation on the disclosed embodiments. Either a local device or a remote device may initiate communication with a remote device or a local device, respectively, without departing from the scope of the disclosure. Further, communications between the user devices may be initially unsecured and subsequently secured by SAAs. In some embodiments, communications may be secured in response to, but not limited to, a user interaction with an SAA associated with a communicating device.

Figure 7:
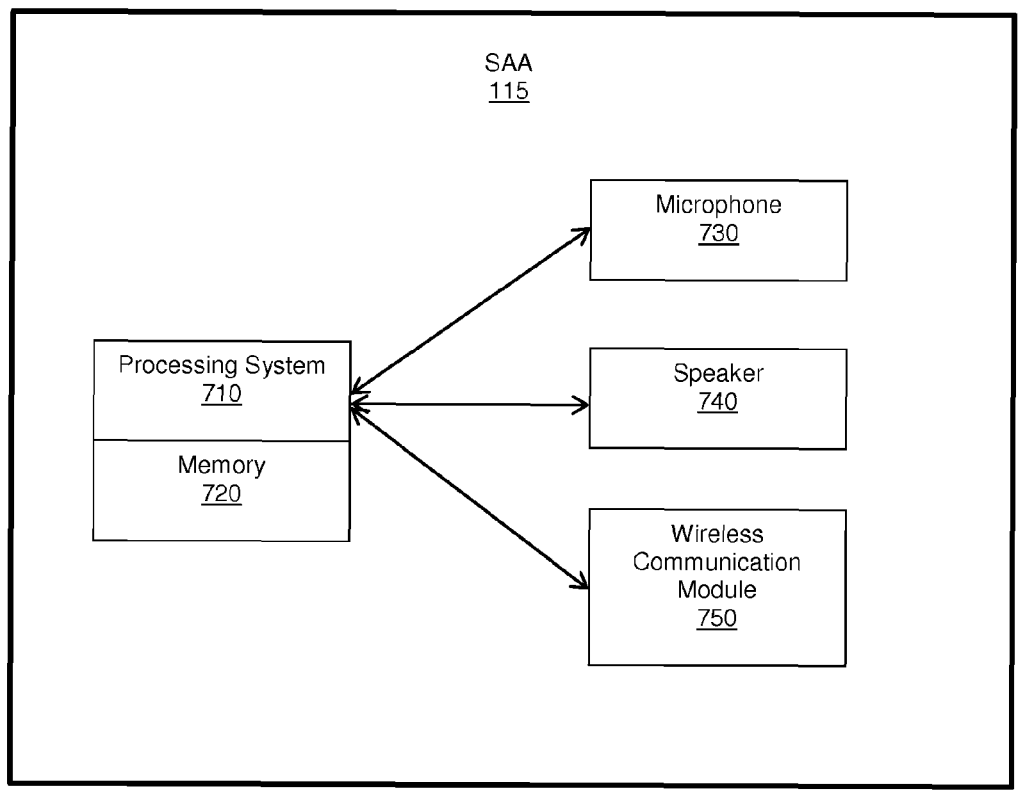
FIG. 7 is a block diagram of an SAA according to an embodiment.

FIG. 7 shows an exemplary and non-limiting block diagram of the SAA 115 according to one embodiment. The SAA 115 may be realized as, but not limited to, a wearable device, an earpiece, a headset, and the like. The SAA 115 may also be integrated in an in-car entertainment system. The SAA 115 includes a processing unit 710 connected to a memory 720, a microphone 730, a speaker 740, and a wireless communication module 750.

In certain implementations, the wireless communication module 750 may be configured to provide communications using, for example, the Bluetooth® protocol, ZigBee®, WiFi®, and so on. During execution of the SAA 115, the wireless communication module 750 may provide communications between the SAA 115 and the respective user device 110.

In an exemplary embodiment, the processing system 710 is configured to obtain the encryption keys and to encrypt and decrypt the voice signals as discussed in further detail herein above.

The memory 720 contains instructions that are executed by the processing system 710. The instructions, when executed by the processing system 710, configure the SAA 115 to perform the disclosed embodiments. Specifically, the memory 720 may include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein. The memory 720 may also maintain the certificate issued for the SAA 115.

The processing system 710 may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

It should be noted that, in the various embodiments disclosed herein, certificates utilized for authenticating and establishing the secured communications may expire. Such expiration may occur after, but is not limited to, a predefined period of time, an occurrence of a particular event, a revocation by the origin of the certificate, and so on. It should further be noted that the SAAs may be configured to perform normal (unsecured) transmissions between devices. Thus, the SAA may be configured to set up a secured communication only when secured communications are required as determined by, a default setting, a user input to the SAA, and so on.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A secured audio apparatus (SAA) for providing secured communications between a local device and a remote device, comprising:
   a processing unit; and
   a memory, the memory containing instructions that, when executed by the processing unit, configure the SAA to:
   receive a remote certificate fingerprint from a remote SAA of the remote device;
   obtain a verified certificate based on the remote certificate fingerprint, wherein the verified certificate is stored in a direct-trust storage during establishment of at least one direct trust, wherein establishment of each direct trust includes sending a local self-signed certificate to the remote SAA and receiving a remote self-signed certificate from the remote SAA when the local SAA and the remote SAA are in close physical proximity;
   generate an ephemeral key based on the obtained certificate, wherein the ephemeral key is used to encrypt and decrypt communications between the local SAA and the remote SAA; and
   secure audio communications between the local SAA and the remote SAA based on the generated ephemeral key.

2. The SAA of claim 1, wherein the ephemeral key is generated based on any of: a Diffie-Hellman (DH) method, an Elliptic Curve Diffie-Hellman (ECDH) method, a Rivest-Shamir-Adleman (RSA) public-key encryption method, an integrated DH Digital-Signature-Algorithm (DH-DSA) key exchange method, an integrated DH-RSA, an integrated ECDH-RSA, and an integrated ECDH Elliptic Curve DSA (ECDH-ECDSA).

3. The SAA of claim 1, wherein the SAA is further configured to:
   compare the remote certificate fingerprint to at least one trusted certificate to determine whether the remote certificate fingerprint matches one of the at least one trusted certificate; and
   upon determining that the remote certificate fingerprint matches one of the at least one trusted certificate, obtain the matching trusted certificate.

4. The SAA of claim 3, wherein the SAA is further configured to:
   upon determining that the remote certificate fingerprint does not match any of the at least one trusted certificate, compare the remote certificate fingerprint to at least one secondary trusted certificate to determine whether the remote certificate fingerprint matches one of the at least one secondary trusted certificate; and
   upon determining that the remote certificate fingerprint matches one of the at least one secondary trusted certificate, obtain the matching trusted certificate.

5. The SAA of claim 4, wherein the at least one trusted certificate is stored in a direct-trust storage, wherein the at least one secondary trusted certificate is stored in a trusted certificate authority storage.

6. The SAA of claim 5, wherein each trusted certificate authority is assigned a trust level, wherein the verified certificate is associated with the certificate authority assigned the highest trust level.

7. The SAA of claim 3, wherein the at least one trusted certificate is stored in the direct-trust storage during establishment of the at least one direct trust.

8. The SAA of claim 3, wherein the at least one trusted certificate is associated with a certificate authority that is identified as trusted by the local SAA and is stored in a secondary trust storage during a personalization of the local SAA.

9. The SAA of claim 4, wherein the SAA is further configured to:
   upon determining that the remote certificate fingerprint does not match any of the at least one secondary trusted certificate, send a request for a verified certificate to the remote SAA, wherein the request identifies at least one trusted certificate authority; and receive a verified certificate from the remote SAA, wherein the received verified certificate is associated with a certificate authority of the at least one trusted certificate authority.

10. The SAA of claim 9, wherein the SAA is further configured to:

receive a request for a certificate and a first list identifying at least one certificate authority trusted by a remote SAA;

retrieve a second list identifying one or more certificate authorities trusted by a local SAA;

determine an intersection between the first list and the second list to identify at least one common certificate authority trusted by both the remote SAA and the local SAA;

issue an appropriate certificate by the at least one common certificate authority; and send the appropriate certificate to the remote SAA.

11. The SAA of claim 10, wherein the appropriate certificate includes at least a chain of recursive certificates.

12. The SAA of claim 10, wherein the at least one common certificate authority is the certificate authority with a highest trust level designated in both the first list and the second list.

13. The SAA of claim 1, further comprising at least one of: a wireless communication module for communicating between the SAA and the local device; and a wired connector for communicating between the SAA and the local device.

14. The SAA of claim 1, wherein the SAA is integrated in any of: a wearable device, an earpiece, a headset, a headphone, and an in-car hands free speakerphone.

15. The SAA of claim 1, wherein the verified certificate includes at least one identifier of a remote user of the remote device.

16. The SAA of claim 15, wherein each identifier includes at least one of: a public key, a user name, a managing certificate authority, and a trust level.

17. The SAA of claim 15, the SAA is further configured to provide a notification about at least one of: the user name, the managing certificate authority, and the trust level of a remote SAA.

18. A method for authenticating a local secured audio apparatus (SAA) associated with a local device to a remote SAA associated with a remote device, comprising:

receiving a remote certificate fingerprint from the remote SAA;

obtaining a verified certificate based on the remote certificate fingerprint, wherein the verified certificate is stored in a direct-trust storage during establishment of at least one direct trust, wherein establishment of each direct trust includes sending a local self-signed certificate to the remote SAA and receiving a remote self-signed certificate from the remote SAA when the local SAA and the remote SAA are in close physical proximity;

generating an ephemeral key based on the obtained certificate, wherein the ephemeral key is used to encrypt and decrypt communications between the local SAA and the remote SAA; and securing audio communications between the local device and the remote device based on the generated ephemeral key.

19. The method of claim 18, wherein obtaining the verified certificate further comprises:

comparing the remote certificate fingerprint to at least one trusted certificate to determine whether the remote certificate fingerprint matches one of the at least one trusted certificate;

upon determining that the remote certificate fingerprint matches one of the at least one trusted certificate, obtaining the matching trusted certificate.

20. The method of claim 19, wherein the ephemeral key is generated based on any of:

a Diffie-Hellman (DH) method, an Elliptic Curve Diffie-Hellman (ECDH) method, a key exchange method based on Rivest-Shamir-Adleman (RSA) public-key encryption method, an integrated DH Digital-Signature-Algorithm (DH-DSA) key exchange method, an integrated DH-RSA, an integrated ECDH-RSA, and an integrated ECDH Elliptic Curve DSA (ECDH-ECDSA).

21. The method of claim 18, wherein obtaining the verified certificate further comprises:

comparing the remote certificate fingerprint to at least one trusted certificate to determine whether the remote certificate fingerprint matches one of the at least one trusted certificate;

upon determining that the remote certificate fingerprint matches one of the at least one trusted certificate, obtaining the matching trusted certificate.

22. The method of claim 21, wherein obtaining the verified certificate further comprises:

upon determining that the remote certificate fingerprint does not match any of the at least one trusted certificate, comparing the remote certificate fingerprint to at least one secondary trusted certificate to determine whether the remote certificate fingerprint matches one of the at least one secondary trusted certificate; and upon determining that the remote certificate fingerprint matches one of the at least one secondary trusted certificate, obtaining the matching trusted certificate.

23. The method of claim 22, wherein the at least one trusted certificate is stored in a direct-trust storage, wherein the at least one secondary trusted certificate is stored in a trusted certificate authority storage.

24. The method of claim 21, wherein the at least one trusted certificate is stored in a direct-trust storage during establishment of at least one direct trust.

25. The method of claim 21, wherein the at least one trusted certificate is generated by a managing certificate authority that is identified as trusted by the local SAA and is stored in the trusted certificate authority storage during a personalization of the local SAA.

26. The method of claim 22, wherein obtaining the verified certificate further comprises:

upon determining that the remote certificate fingerprint does not match any of the at least one secondary trusted certificate, sending a request for a verified certificate to the remote SAA, wherein the request identifies at least one trusted certificate authority; and receiving a verified certificate from the remote SAA, wherein the received verified certificate is associated with a certificate authority of the at least one trusted certificate authority.

27. The method of claim 26, further comprising:

receiving a request for a certificate and a first list identifying at least one certificate authority trusted by a remote SAA;

retrieving a second list identifying one or more certificate authorities trusted by a local SAA;

determining an intersection between the first list and the second list to identify at least one common certificate authority trusted by both the remote SAA and the local SAA;

issuing an appropriate certificate by the at least one common certificate authority; and sending the appropriate certificate to the remote SAA.

28. The method of claim 18, wherein the appropriate certificate includes at least a chain of recursive certificates.

29. The method of claim 18, wherein the at least one common certificate authority is the certificate authority with a highest trust level designated in both the first list and the second list.

30. A non-transitory computer readable medium having stored thereon instructions for causing one or more processing units to execute the method according to claim 18.

* * * * *